Nov. 1, 1966          J. F. PFEFFER, JR          3,282,833
ELECTRICAL DISCHARGE TREATMENT OF FILM AND APPARATUS
Filed Jan. 22, 1963

INVENTOR
JAMES F. PFEFFER JR.

BY *A. Ralph Snyder*
ATTORNEY

United States Patent Office 3,282,833
Patented Nov. 1, 1966

3,282,833
ELECTRICAL DISCHARGE TREATMENT OF FILM AND APPARATUS
James F. Pfeffer, Jr., Newark, Del., assignor to E. I. du Pont de Nemours and Company, Wilmington, Del., a corporation of Delaware
Filed Jan. 22, 1963, Ser. No. 253,183
6 Claims. (Cl. 204—168)

This invention is concerned with the treatment of plastic films and more particularly with improvements in the electrical discharge treatment of plastic films to render the surfaces thereof adherent to other materials such as inks, adhesive, coatings and the like.

One of the most widely used methods for treating plastic films to render the surfaces thereof adherable involves passing the plastic film between spaced electrodes wherein the surface or surfaces of the film are subjected to the action of an electrical discharge which has the effect of altering the surface to the degree that adherability is attained.

One of the difficulties encountered in this method of treatment is that in areas wherein there may be minute flaws or pin holes in the film being passed between the electrodes there is a tendency for the electrical discharge to funnel through the weak spot or pin hole because of the lower dielectric resistance, and as a consequence, the remainder of the electrode has little effect on distributing an electrical discharge over the full width of the film. Thus, there is the effect that coincident with the bleeding through or arcing through of the electrical discharge through a pin hole the entire width of the film sheet being treated at that moment has an untreated strip running the full width of the film under treatment. The presence of such untreated strips which are difficult to detect in treated film has a most deleterious effect in subsequent adhering operations such as printing, coating and the like.

It is therefore an object of this invention to provide a process which is free of the above-described difficulties. A more specific object is to provide improvements in the electrical discharge method an apparatus for treating plastic film surfaces to the end that momentary arc-through during treatment will not result in significant untreated areas of the film surface. These and other objects will more clearly appear hereinafter.

The foregoing objects are realized by the present invention which, briefly stated, comprises in the continuous treatment of plastic film to render the surface thereof adherent to printing, coatings, and the like wherein said film is passed through and subjected to the action of an electrical discharge, the improvement which comprises passing said film successively through at least two elongated zones of electrical discharge said zones being disposed transversely of the film and at an oblique angle with respect to the axis (direction) of film travel, the oblique angles of successive zones being of opposite rotation to the zone preceding.

In the preferred embodiment of this invention, a flat sheet of plastic film is passed between successive pairs of elongated stationary electrodes, each pair spaced to provide a uniform gap therebetween in which an electrical discharge is maintained, said pairs of electrodes being disposed at an oblique angle of between 30° and 88° from the axis of film travel, the oblique angles of the succeeding pairs of electrodes being of opposite rotation and of equal values.

My invention will now be more particularly described with reference to the accompanying drawing wherein.

Figure 1:
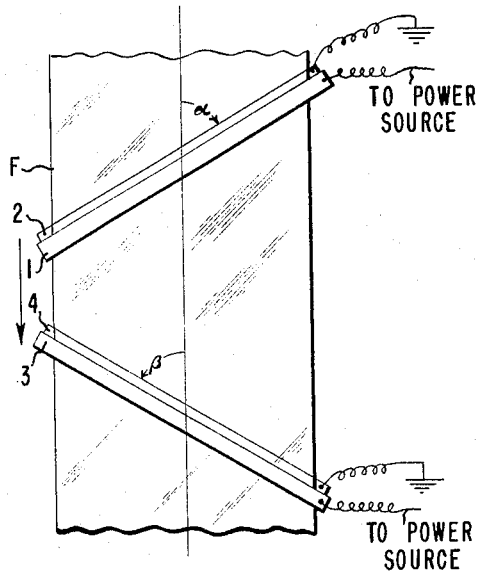
FIGURE 1 is a diagrammatic illustration showing the relative disposition of the successive pairs of electrodes with respect to the axis of film travel.
Figure 2:
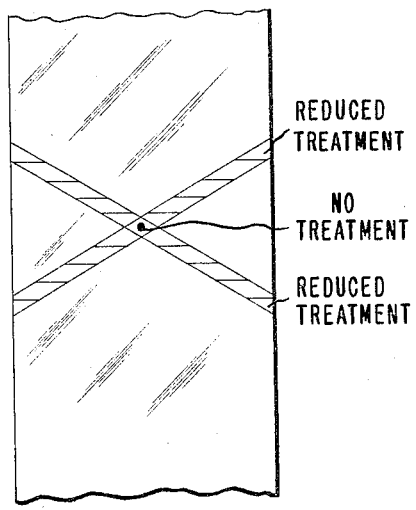
FIGURE 2 is a schematic illustration of the pattern of treatment accomplished by the arrangement of FIGURE 1 when arc-through is encountered.

Referring to FIGURE 1, a flat web F of plastic film F, continuously fed from a supply roll (not shown), is successively passed through (1) the gap formed between elongated frontal electrode 1 positioned so that the longitudinal axis thereof is at an angle ($\alpha$) of from 30° to 88° from the axis of film travel (i.e., the longitudinal axis of the travelling web), and an opposed parallel, grounded backing electrode 2; and (2) the gap formed between elongated frontal electrode 3 and opposed, parallel, grounded backing electrode 4, positioned at an angle ($\beta$) of from 30° to 88° from the axis of film travel but oppositely rotated with respect to electrodes 1 and 2. Each pair of electrodes is powered by any convenient hgih frequency spark generating source (not shown) effective to provide a continuous electrical discharge between the opposed frontal and backing electrodes. As any increment of film containing a pin hole passes through the electrical discharge maintained at the gap between electrodes 1 and 2, an arc-through will occur at the pin hole and the electrical discharge will concentrate at this point so that an obliquely disposed transverse zone of film of a width corresponding roughly to the width of the electrode will secure substantially no treatment. As the increment of film containing the pin point approaches the gap between the second pair of electrodes the advance portion of the untreated zone of film will be treated as it passes through the gap since the second pair of electrodes will function normally until the moment the pin hole reaches the gap. Similarly, the trailing portion of the untreated zone will be treated as it passes through the gap since the pin hole will have passed the gap and the electrode will again be functioning normally. The pattern of treatment on the film is illustrated in FIGURE 2.

Figure 3:
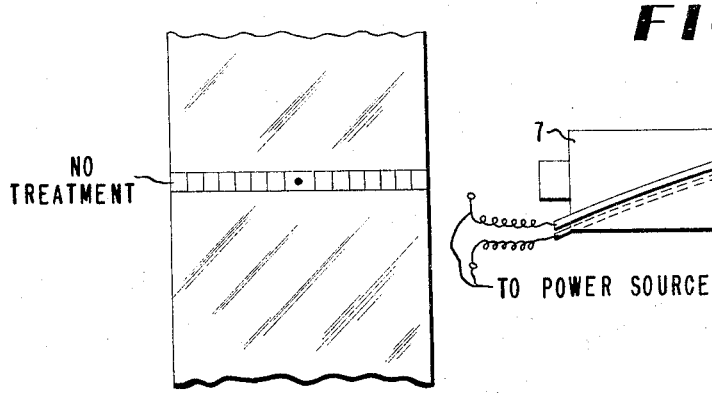
FIGURE 3 is a schematic illustration of the pattern of treatment during arc-through resulting from the use of single pairs of electrodes aligned normal to the axis of film travel.

To demonstrate the effect of the arrangement just described, a one-mil polyethylene film was passed between the two pairs of electrodes, the first of which was skewed at an angle of 86° from the axis of film travel while the second pair of electrodes was positioned 86° counterclockwise from the axis of film travel. The electrodes were each powered by a Lepel High Frequency Spark Generator Model No. HFSG-6. The rate of film travel through the electrodes was 200 feet per minute. The setting on the unit supplying power to the electrodes was 2.5 kw. It was observed that on the occasion of any arc-through due to flaws in the film only a very small area surrounding the actual pin hole was observed to be untreated when tested on printability test, as shown in FIGURE 2. As a control, the same film was passed through a similar apparatus with the pairs of electrodes positioned parallel to one another at an angle of 90° to the axis of film travel. The setting of the power generator and the treating speed was the same as in the preceding illustration. It was observed that when arc-through of the film occurred a strip or zone of film essentially the width of the electrode and extending across the full width of the sheet was left untreated, as illustrated in FIGURE 3.

Figure 4:
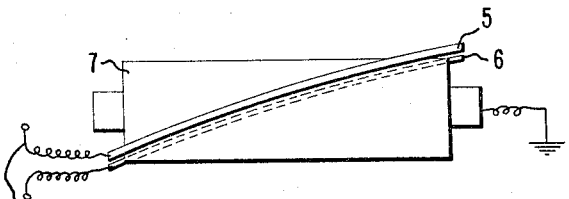
FIGURE 4 is a diagrammatic illustration of the application of my invention in the treatment of film passing over a grounded roll or drum.

While the invention is illustrated to show the use of stationary spaced electrodes for treating of flat sheets, the basic principles of this invention are applicable also for use on a flat sheet wherein but one side of the film is to be treated and in which case the frontal electrodes 5 and 6 (FIGURE 4) will be stationary and the backing electrode 7 will be rotatable, for example, in the form of a roll. In this instance, the stationary frontal electrodes 5 and 6 are each shaped to follow the contour of the ground roll in spaced relationship in a helical fashion so that transverse segments of the film passing over the rotating electrode will pass beneath the first frontal electrode in lateral sequence from one edge of the film to the other and in reverse sequence as the same segments pass beneath the succeeding frontal electrode.

The invention is also applicable to the treating of film in tubular form wherein the electrode pairs in spaced relationship to each other could be in the form of elliptical arrangements, each ellipse being disposed at an oblique angle from the line representing the axis of film travel and wherein the oblique angle of the succeeding electrode pairs would be of opposite rotation so that the transverse sequence of lanes through the first set of electrodes would be the reverse of the sequence through the second set of electrodes.

The potential difference between the electrodes may very from very low voltages, i.e., 1000 volts, up to pulsating peak voltages of 100,000 volts or above. In general, it is preferred to maintain the voltage above 2,000 volts, i.e., 2,000–100,000 volts. Frequencies ranging from 60 cycles per second to 800,000 or more cycles per second may be used. Preferred are frequencies of at least 3000 cycles per second and particularly frequencies in the range of 200,000–500,000 cycles per second in order to obtain effective treatment at commercially feasible exposure times. Essentially any convenient high freqency spark generator or motor generator set can be used as a source of power for the electrodes.

The electrodes used may be in the form of solid rods or bars, flat or tapered metal strips or they can be in the form of hollow metal tubes through which gaseous agents may be introduced into the treating zone, if desired. The electrodes may be constructed from stainless steel, aluminum, brass, or any other electrically-conductive material.

In general, the effectiveness of the treatment increases with the amount of current to the electrodes for a given area of electrode and with the time of exposure. The current to the electodes may vary anywhere from 0.5 radio frequency ampere to 5.5 radio frequency amperes, or higher. However, to obtain reasonable treating times while avoiding over-treatment, a range of 0.5–3.5 radio frequency amperes is ample.

The electrodes are preferably spaced from each other to provide a gap of 0.01 inch to 0.125 inch. However, useful results can be obtained with electrode gaps as low as 0.0005 inch or as high as 0.25 inch, provided suitable adjustments in the amount of current, the electrode dimensions and the exposure time are made. The flat plastic materials treated by the present invention may pass through the gap without contacting the electrodes or they may be permitted to contact one or both electrode surfaces.

The invention is operable for the treatment of a single layer of film or multiple layers of film can be treated simultaneously in the manner described in patent application Serial No. 162,728, filed December 28, 1961, now abandoned, by J. D. Greenwell and J. L. McGuire. Moreover, the invention is operable on substantially any plastic film which is susceptable to treatment in an electrical discharge to improve adherability. Such films include those of polyolefins such as polyethylene and polypropylene, polyvinyl chloride, polyvinyl fluoride, polyvinylidene chloride, polyvinylidene fluoride, tetrafluoroethylene, hexafluoropropene as well as corresponding copolymes.

My invention is particularly valuable for treatment of the thinner gauges of films which are produced at high production rates and which require for effective treatment at the high through-puts a high intensity electrical discharge. Because of the high intensity electrical discharge, the tendency for burn-through or arc-through in such thin films as these is more frequent than with heavier films. Reduction in the amount of untreated areas, particularly those which extend the full width of the sheet, is most valuable particularly where the treated film is to be subsequently printed.

I claim:
1. In a continuous process for treating a plastic film to render the surface thereof adherent to printing, coatings and the like wherein said film is passed through and subjected to the action of an electrical discharge, the improvement which comprises passing said film successively through at least two elongated zones of electrical discharge, said zones being disposed transversely of the film and at an oblique angle with respect to the axis of film travel, the oblique angles of successive zones being of opposite rotation to the zone preceding.

2. The process of claim 1 wherein said oblique angles are within the range of from 30° to 88°.

3. The process of claim 2 wherein said oblique angles are of the same value.

4. Apparatus for treating plastic film to render the surface thereof adherent to printing, coatings and the like comprising, in combination, a first elongated frontal electrode, an opposed parallel backing electrode, said electrodes being spaced to provide a gap therebetween, means for maintaining an electrical discharge across said gap, a second elongated frontal electrode, an opposed parallel backing electrode, said last named electrodes being spaced to provide a gap therebetween, means for maintaining an electrical discharge across said last named gap, said frontal electrodes being angularly disposed relative to each other such that flat film passing successively through said gaps will be subjected to treatment in elongated zones transverse to the axis of film travel, the longitudinal axis of each zone being at an angle of from 30° to 88° to the axis of film travel, the longitudinal axis of the second zone being of opposite rotation to that of the zone preceding, and means for passing film successively through said gaps.

5. The apparatus of claim 4 wherein said frontal electrodes are in the same plane.

6. The apparatus of claim 4 wherein said angles are of the same value.

References Cited by the Examiner

UNITED STATES PATENTS

| | | | |
|---|---|---|---|
| 2,864,756 | 12/1958 | Rothacker | 204—168 |
| 2,935,418 | 5/1960 | Berthold et al. | |
| 3,017,739 | 1/1962 | Dewey | 204—165 |

JOHN H. MACK, *Primary Examiner.*

H. M. FLOURNOY, *Assistant Examiner.*